June 12, 1962  A. L. BOEGEHOLD  3,038,563
BRAKES
Filed Oct. 30, 1956

INVENTOR.
ALFRED L. BOEGEHOLD
BY
HIS ATTORNEY

United States Patent Office 3,038,563
Patented June 12, 1962

3,038,563
BRAKES
Alfred L. Boegehold, Orchard Lake, Mich., assignor to General Motors Corporation, Detroit, Mich., a corporation of Delaware
Filed Oct. 30, 1956, Ser. No. 619,261
2 Claims. (Cl. 188—218)

This invention relates to energy absorbing devices and is particularly concerned with improved braking surfaces for use in connection with brakes and the like.

It is, therefore, the main object of the invention to provide a brake element which, due to its specific braking surface, yields improved results over brake elements heretofore used.

In carrying out the above object, it is a further object to provide a brake drum having high heat transfer characteristics wherein the braking surface per se is formed of molybdenum applied by a metal spray method to produce a surface having unusually good frictional characteristics and long life.

A still further object of the invention is to provide an aluminum brake drum including a braking surface formed from sprayed molybdenum in a layer ranging from .002 to .030 of an inch in thickness.

Further objects and advantages of the present invention will be apparent from the following description, reference being had to the accompanying drawings wherein preferred embodiments of the present invention are clearly shown.

In the drawings:

FIGURE 3 is a plan view of a conventional brake drum showing the apertures provided in the back portion thereof for mounting the drum on a wheel or the like.

Figure 1:
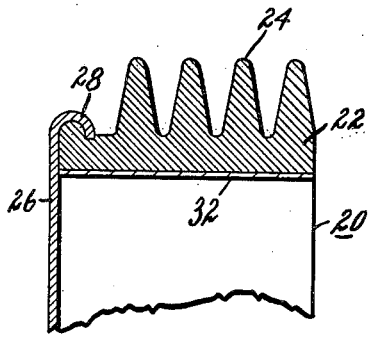
FIGURE 1 is a fragmentary cross section of a brake drum having a finned outer surface to facilitate cooling.
Figure 3:
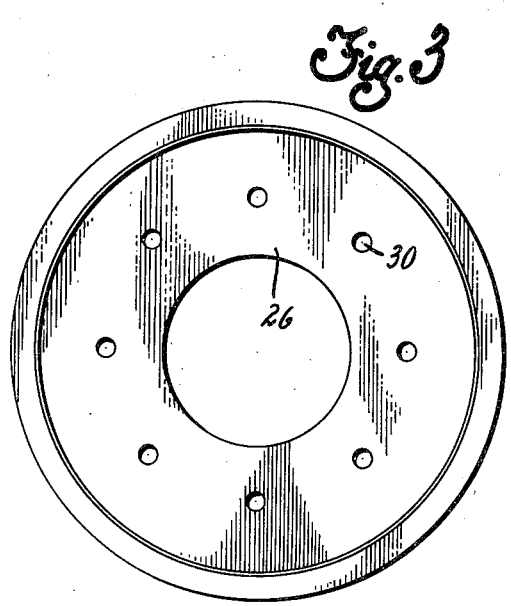

Modern design of motor vehicles has placed an added burden on the brake equipment used in connection with such vehicles. Higher speeds require braking equipment which will wear for longer periods of time than brake equipment heretofore used. Furthermore, due to the high speeds, more heat is generated at the braking surfaces during a stop of successive stops which causes an increasing number of problems, for example, providing materials which will withstand the higher braking temperatures involved.

Added to these difficulties is the problem of obtaining materials which will provide uniform frictional characteristics over the wide range of temperatures encountered in modern braking applications.

Many useful and improved friction materials have been provided in recent years which have improved the braking facilities of modern vehicles. Such advances include metallic linings, as disclosed in copending application, S.N. 540,842, now abandoned, assigned to the assignee of this invention, non-metallic linings including temperature resistant binders as disclosed in copending application, S.N. 550,107, now Patent No. 2,954,853, assigned to the assignee of this invention, etc. While the art has advanced tremendously with respect to linings, very little, if anything, has been done to improve the braking surfaces, for example, the brake drum or brake disc which rubs against the lining. In this instance, the usual cast iron surface is provided as a rubbing surface for the friction material involved.

It has come to my attention that the brake element surface or the rubbing surface upon which the friction material operates can be greatly improved which enhances the characteristics of the over-all brake. I have further found that much of the difficulty experienced in brakes can be attributed to the temperatures experienced at the rubbing or drum surface. Fading characteristics increase during repeated stops as the temperatures increase and, for this reason, it is extremely useful to have rubbing surfaces that quickly conduct away the heat to maintain the temperature of the rubbing surfaces at a more or less useful maximum temperature under any conditions. Aluminum is an exceptionally good conductor of heat but cannot be used with any degree of success as a rubbing surface due to the fact that it wears excessive and, therefore, aluminum has only been used heretofore as the radiated surface in connection with, for example, a cast iron rubbing surface. In this instance, the aluminum and cast iron are held in intimate contact by mechanical means and the rate of heat transmission from the iron to the aluminum is not, therefore, the theoretical optimum due to infinitesimal areas that are not in intimate contact with one another. In the present invention, the rubbing surface may be integrally attached to the radiating surface such as the aluminimum since the rubbing surface is applied by metal spraying and is a metal which intimately bonds, during the spray operation, to the aluminum. In this connection, it is apparent that while aluminum produces a most advantageous combination with the sprayed metal rubbing surface that the same sprayed metal may be applied to other radiating metals, if desired, with varying degrees of success and, in all cases, forms an intimate coextensive bond therewith to provide maximum heat conductivity through the supporting meal. Furthermore, due to the very thin character of the sprayed metal layer no large amount of heat is held therein but is readily transmitted into the backing metal from whence it may be dissipated by radiation. These factors reduce the fading characteristics normally present when using cast iron rubbing surfaces of substantial thickness.

The present invention is, therefore, directed to an improvement in the rubbing surface used in connection with the usual friction material of a brake. This rubbing surface may be applied to either the brake drum or disc, in the case of a disc brake.

Specifically, the surface which I have found to be exceptionally useful is one formed from molybdenum. This meterial yields a rubbing surface which produces greatly improved results over cast iron rubbing surfaces when the rubbing surface is properly applied. Molybdenum is more wear-resistant than iron and, when applied as by metal spraying, produces a surface that is entirely different than any surface heretofore known. In this connection, I propose to coat the surface of a brake element with molybdenum by spraying the molybdenum directly onto the supporting surface through the use of a conventional metal spraying gun, such as a "Shoop" or a "Schori" gun, or any other satisfactory metal spray equipment. The molybdenum is coated onto the supporting surface in a thickness in the order of .002 to .030 of an inch. In this connection, molybdenum layers less than .002 are too thin to be practical while layers of over .030 increase the cost and are, therefore, undesirable. In other words, the specific range is not a critical range so far as the upper limit is concerned but defines an economic range wherein increased thicknesses add nothing to the effectiveness of the layer while adding to the expense to the finished element.

It has been my observation that as the molybdenum is sprayed onto a metal supporting surface, hot particles of the metal are atomized in the atmosphere as they are transmitted from the gun to the supporting surface. During this movement, oxidation occurs as does some degree of nitriding wherein the molybdenum picks up oxygen and nitrogen from the atmosphere. These particles are then dispersed and flattened onto the supporting surface to produce a layer of molybdenum interspersed with molybdenum oxide and molybdenum nitride and coextensively bonded to the support. When a layer of a satisfactory thickness has been built up, the surface may be machined to dimension, for example, by grinding, if desired, and is then ready for use. In this connection, the finished layer is made up of a generally lamellar structure with oxide and nitride inclusions interspersed therethrough.

I have found that brake operation using brake drums with molybdenum rubbing surfaces have about the same degree of energy absorption under normal braking loads as are obtained when using cast iron surfaces. However, upon repeated stops from high speed, the brake operates more satisfactorily in that the usual fade characteristics of a brake including a cast iron rubbing surface substantially disappear and the pedal pressure, for a plurality of stops within a defined distance from high speed, remains substantially unchanged rather than showing a constant increase from one stop to the next as is the case of cast iron.

Furthermore, the molybdenum surface has outstanding wear characteristics when compared to cast iron. Tests have shown that cast iron drums, after a thousand stops from a given high speed, show appreciable wear whereas a molybdenum coated drum, after a thousand stops, from comparable high speeds, shows no noticeable wear.

In another series of tests wherein quantitative and comparative wear figures were obtained, the molybdenum surfaced drum showed fifty to fifty-five times the resistance to wear that was observed in connection with a cast iron drum. From these figures, it is obvious that the molybdenum presents a longer wearing material which, due to its frictional characteristics, improves the operation of the brake by reducing fade and increasing the life of the brake.

Specifically, I prefer to apply the molybdenum to some metal backing which has a high degree of heat conductivity, for example, aluminum or aluminum alloy. In this case, molybdenum is sprayed directly onto aluminum drum or plate. In the case of an aluminum or aluminum alloy brake drum, the aluminum is finned or grooved to improve the heat transfer characteristics of the article. It is understood that this same improved friction surface may be applied to iron, steel or cast iron, etc., if desired, to yield improved results. Referring specifically to the drawings, in FIGURE 1 a composite aluminum and steel brake drum is shown at 20 wherein the aluminum rim portion 22 is finned as at 24 to provide large area heat radiating surfaces. At the back of the drum, a steel plate 26 is peripherally crimped over the aluminum rim portion at 28 to provide a supporting structure by which the drum may be anchored to the operating mechanism, by means of bolts passing through a plurality of apertures 30 provided in the plate 26. At the rubbing, or inner, surface of the brake drum 20 and coextensively bonded to the aluminum portion 22 thereof is a molybdenum layer 32 applied by metal spraying to the surface of the aluminum.

Figure 2:
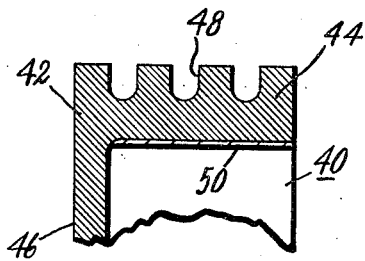
FIGURE 2 is a fragmentary cross section of another type of brake drum wherein the outer surface is grooved to facilitate cooling.
Figure 4:
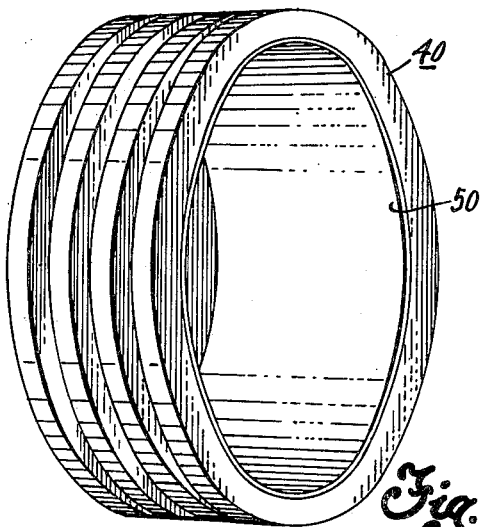
FIGURE 4 is a perspective view of a brake drum similar to that shown in FIGURE 2 wherein the outer surface is grooved.

FIGURE 2 shows a modification of this design wherein a brake drum 40 is formed from a cast aluminum part 42 including an annulus 44 and an integral back plate 46. In this embodiment, the annulus 44 is grooved at 48 to provide additional cooling surfaces. A molybdenum layer 50 is sprayed on the internal surface of the annulus 44.

Figure 5:
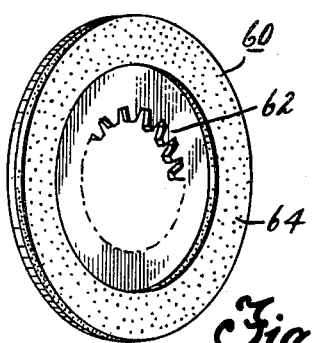
FIGURE 5 is a perspective view of a disc element which may be used in disc brake applications.

In FIGURE 5, an element 60 for a disc brake is shown. In this connection, the element may be splined around the central aperture as at 62 so that it may be keyed to a shaft or it may be splined around the external periphery thereof, if desired. A molybdenum layer 64 is sprayed on the face of the plate 60 and may be applied to both sides thereof or only one side in accordance with the specific structure of the disc brake which forms no part of this invention. The disc 60 may be cast aluminum or it may be punched from sheet steel or aluminum, as desired.

Molybdenum forms a very strong, coextensive bond with other metals when applied directly thereto by metal spraying techniques. Prior to applying sprayed metal, the surface upon which it is to be deposited should be properly cleaned, chemically and/or mechanically, to assure a good bond. Sand, grit or shot blasting are suitable mechanical processes for preparing the surface, while conventional chemical dips and washing operations may also be used, as desired.

While the forms of embodiment of the present invention as herein disclosed constitute preferred forms, it is to be understood that other forms might be adopted.

What is claimed is as follows:

1. A brake drum comprising a predominantly aluminum supporting surface, a rubbing surface comprising a single layer of sprayed molybdenum applied directly to the internal peripheral surface only of said supporting surface and coextensively and directly attached thereto, said rubbing surface having a thickness of from .002 to .030 of an inch, and heat radiating surfaces provided on the drum in heat conducting relation to said sprayed molybdenum surface.

2. A brake drum comprising a strong metal supporting surface, a rubbing surface comprising a single layer of sprayed molybdenum applied directly to the internal peripheral surface only of said supporting surface and coextensively and directly attached thereto, said rubbing surface having a thickness of from .002 to .030 of an inch, and heat radiating surfaces provided on the drum in heat conducting relation to said sprayed molybdenum surface.

References Cited in the file of this patent

UNITED STATES PATENTS

| | | |
|---|---|---|
| 1,746,924 | Bendix | Feb. 11, 1930 |
| 1,989,211 | Norton | Jan. 29, 1935 |
| 2,217,001 | Bockius et al. | Oct. 8, 1940 |
| 2,588,421 | Shepard | Mar. 11, 1952 |
| 2,588,422 | Shepard | Mar. 11, 1952 |
| 2,719,438 | Schiefer | Oct. 4, 1955 |
| 2,775,323 | English | Dec. 25, 1956 |

FOREIGN PATENTS

| | | |
|---|---|---|
| 575,929 | Great Britain | Mar. 12, 1946 |
| 677,144 | Great Britain | Aug. 13, 1952 |